Jan. 23, 1945.   R. W. BROWN   2,367,822
MOLD CONSTRUCTION
Filed July 3, 1941   2 Sheets-Sheet 1
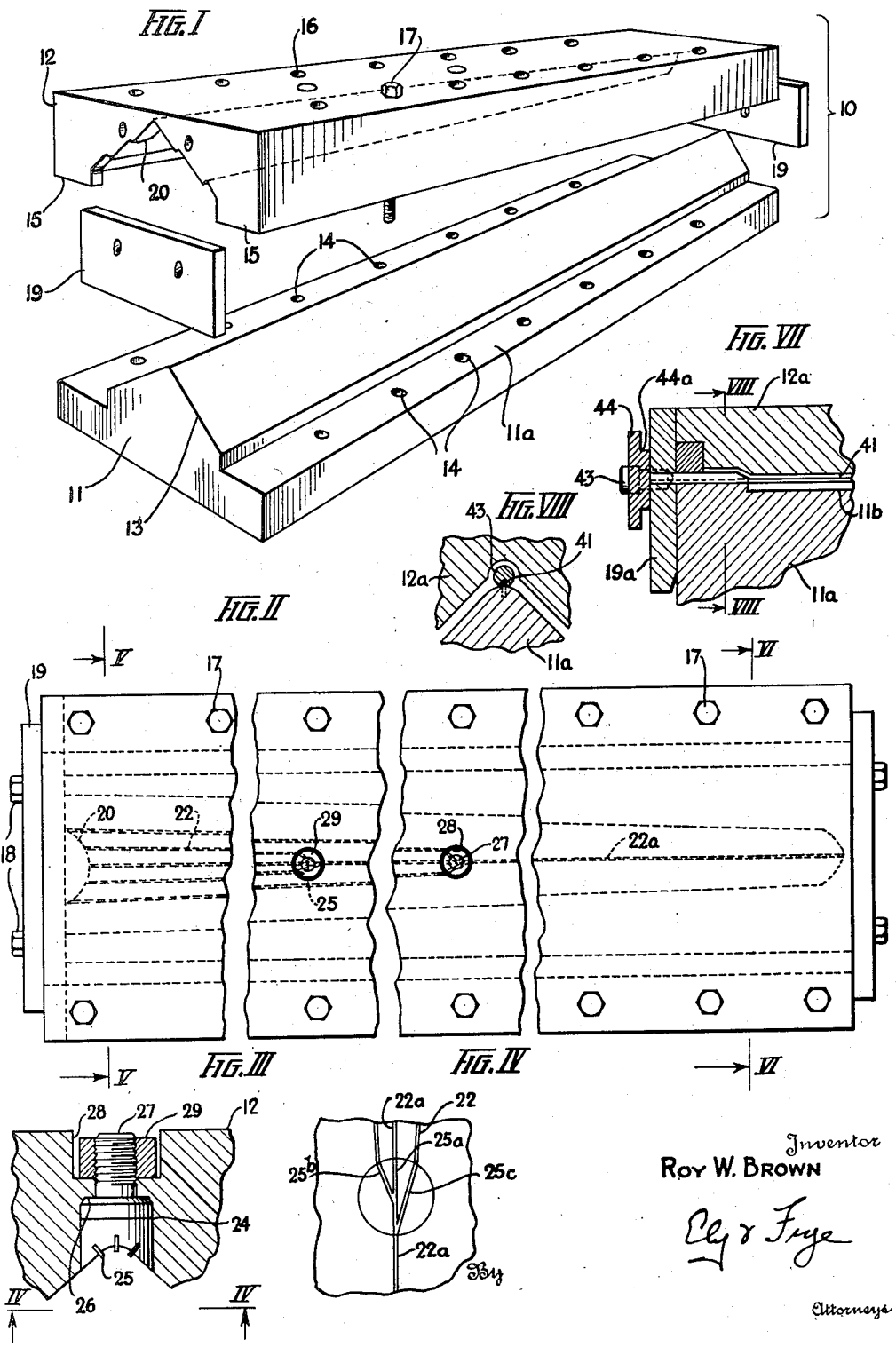
Inventor
Roy W. Brown Jan. 23, 1945. R. W. BROWN 2,367,822
MOLD CONSTRUCTION
Filed July 3, 1941 2 Sheets-Sheet 2
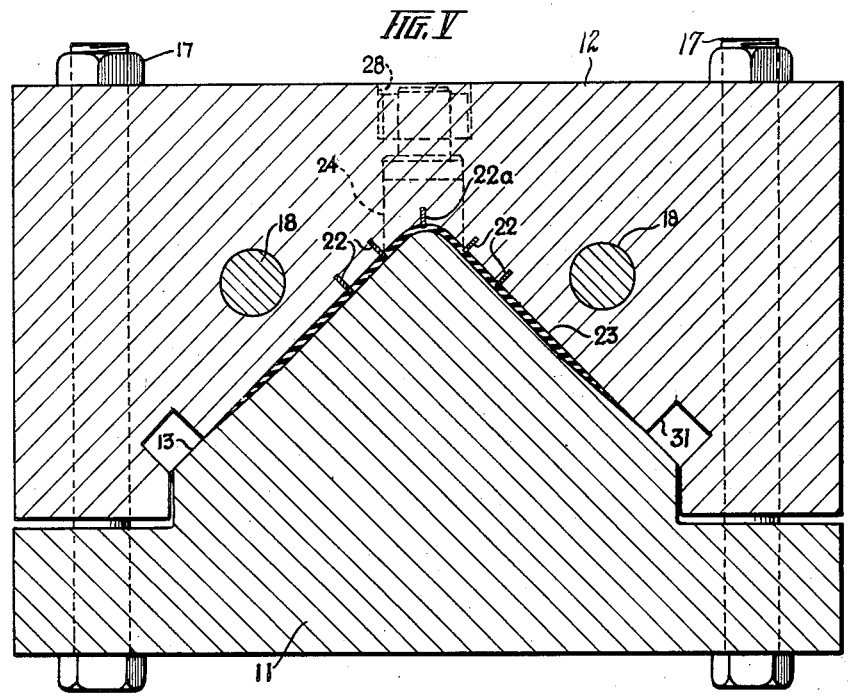
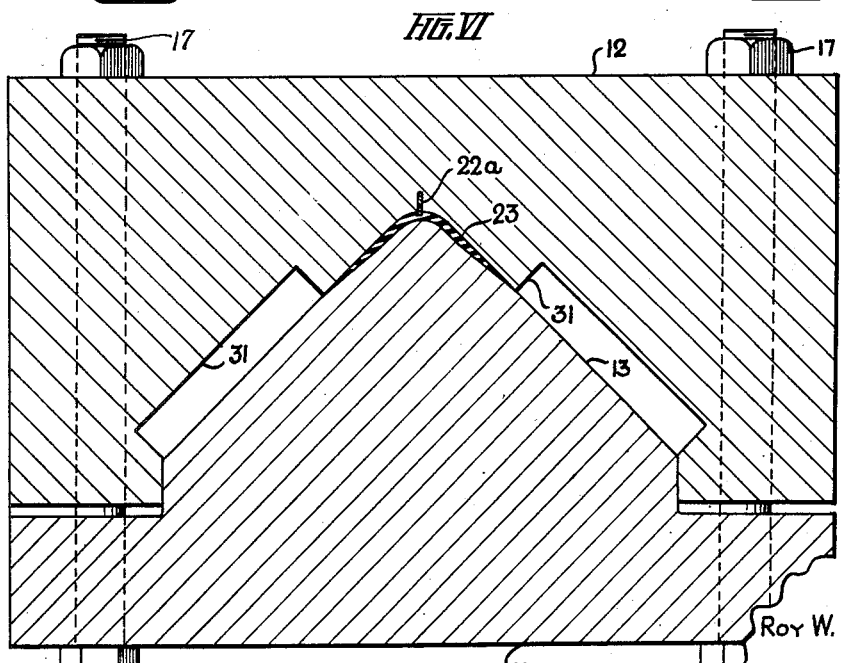
Inventor
Roy W. Brown
By
Attorneys Patented Jan. 23, 1945

2,367,822

UNITED STATES PATENT OFFICE 2,367,822

MOLD CONSTRUCTION

Roy W. Brown, Akron, Ohio, assignor to The Firestone Tire & Rubber Company, Akron, Ohio, a corporation of Ohio Application July 3, 1941, Serial No. 400,934

7 Claims. (Cl. 18—42)

This invention relates to mold constructions, especially to specialized molds for manufacture of thin rubber goods which have smooth surfaces and thin uniform feather edges, such as rubber deicer shoes.

The general object of the present invention is to provide an inexpensive, non-complicated mold for producing rubber deicer shoes having a dihedral angular contour and a feathered edge construction facilitating the positioning of the shoe on a propeller.

A further object of the invention is to provide a deicer shoe mold which is adapted to form a shoe having varying length converging grooves therein, the converging sections of the grooves being adjustable.

Another object of the invention is to provide a mold adapted to permit ready escape of air from the mold cavity.

The foregoing and other objects will be manifest as the specification proceeds, the invention being described with particular reference to the accompanying drawings, of which:

Figure I is a perspective view of a mold structure embodying the invention, with the elements thereof shown in disassembled position;

Figure II is a plan of the assembled mold, with longitudinal portions thereof removed;

Figure III is a section through a fragment of the mold of Figure II showing the inserts therein;

Figure IV is a bottom plan of the structure of Figure III;

Figures V and VI are vertical sections taken on lines V—V and VI—VI of Figure II;

Figure VII is a fragmentary vertical section through the end of a modified mold construction of the invention; and Figure VIII is a section on line VIII—VIII of Figure VII.

Referring especially to the Figure I of the drawings, a mold 10 is shown, which mold generally comprises a base section 11 and a cover section 12. The base section 11 has an upper rib 13 which is substantially triangularly shaped in section formed in the center of and extending the length of the section. A series of apertures 14 are formed in the edges of the mold section 11 to receive bolts or other means therein for securing the mold sections together. The cover section 12 is adapted to mate with the mold section 11 and form a cavity C of substantially inverted "V" shape therebetween for producing a rubber deicer shoe heaving a dihedral angular shape. This cavity extends substantially the length of the sides of the rib 13 at one end (base) of the mold, but decreases in width toward the farther or tip end of the mold. The cover section 12 has downwardly extending edge portions 15 which are adapted to abut on the mold section 11 with holes 16 being formed therethrough in positions coincident with the holes 14 in the mold section 11 to receive bolts 17 used to secure the mold sections together. However, the mold sections may be secured to the platens of a platen press and be brought together by movement of the platens, which can be heated to set the molded material. Figure V shows that bolts 18 extend through end plates 19 of the mold 10 in order to secure the end plates to the cover mold section and completely enclose the molding cavity. A boss 20, having an arcuate face, in projection, on its inner end is formed on the mold face of the cover section 12 at the base end thereof to form a sump for the deicer fluid to be distributed by the deicer shoe formed therein.

The cover mold section 12 also has means such as thin metal strips 22 received therein and extending therefrom to form grooves in a rubber deicer shoe 23 formed in the mold 10. The metal strips 22 extend longitudinally of the mold from the base end thereof, abutting the boss 20, and are positioned at the center of the deicer shoe 23 at similar distances on both sides of the center or top of the mold cavity. The metal strips 22 are received in recesses formed in the mold section 12 and may be secured therein in any desired manner. In some cases, it may be satisfactory to form integral ribs on the molding surfaces of the mold cover 12, but experience has shown that the use of separate (removable) metal strips is desirable for this purpose because of the dimensions involved. The strips may converge toward the tip end of the mold.

As it has been found desirable to have the grooves formed in the sides of the deicer shoe 23 connect to the center groove, suitable means, including removable plugs 24 are placed in the mold 10 for this purpose. Each of the removable plugs 24 has an inner surface that conforms to the molding surface of the mold cover 12 and is flush therewith, and projecting from said surface are integral ribs, or metallic strips 25 that are mounted therein. Figure IV indicates that one rib 25a extends longitudinally of the insert 24 and connects to the center metallic strip 22a of the mold cover at both ends in order to form a longitudinally extending groove in the center of the deicer boot. Then too, other ribs 25b and 25c each connect to or abut against the end of one of the metallic strips 22 and extend from such end to the center strip 25a that, in turn, constitutes a portion of the groove-forming strip 22a. Plugs 24 are removably mounted in the mold section 12 by being drawn against shoulders 26 formed in the mold section 12. The plugs 24 have threaded ends 27 that are received in counterbores 28 of the outer surface of the mold while nuts 29 for retaining the plugs in position are also received within said counterbores.

In forming the mold cover 12, the mold face 12a thereof is highly polished and the mold surfaces of the two mold sections are both formed with very low tolerances because of the fine sized article to be formed therein. Figures V and VI best show that longitudinally extending chambers 31 are formed along each side of the mold cover 12 immediately adjacent the molding surfaces thereof. The chambers 31 are formed adjacent the lower edges of the rib 13 and extend upwardly of the rib to a point adjacent the edges of the deicer shoe 23 so that the chamber becomes larger as the molding cavity extends farther from the base end of the mold 10. Overflow from the mold 10, as well as entrapped air, can flow into the chambers 31, which may be vented to the atmosphere. Usually the mold overflow in fine articles is substantially negligible because the mass of rubber placed into the mold is usually formed to substantially the shape and size of the article desired.

It will be seen that the exact positioning of the ends of the grooves formed in the deicer shoe 23 may be varied merely by changing the plugs 24 so that the specific manner in which the side deicer grooves connect to the center of principal deicer groove can be varied readily. This angle of communication is important in deicer shoe construction.

Another feature of the invention is that the groove forming strips or ribs of the mold can readily be replaced if they are broken off. If such ribs were formed integrally with the mold, the entire mold necessarily would have to be discarded when any segment of the rib would be broken. Then too, the formation of such thin, long ribs, as used in the mold of the invention would be a very delicate, expensive machine operation.

Figures 7 and 8 show the details of a modification of the invention wherein a mold section 11a is provided with a cover section 12a on which an end plate 19a is mounted. The mold sections 11a and 12a form a cavity therebetween of the same general contour as in the other embodiment of the invention. However, in the present construction, a thin or fine wire 41 extends the length of the molding cavity and is positioned upon the apex of the rib on the mold section 11a. The rubber forming the deicer shoe covers the wire or embeds the wire in its lower surface so that a recess is formed on the under or inner surface of the deicer shoe formed. An insert rib 11b is carried in the upper surface of the rib. The wire 41 is secured to the end of an elongated headed pin 43 that in turn extends through the end plate 19a of the mold. The pin 43 is seated in an auxiliary cover plate 44 carried by the end plate 19a. The cover plate 44 has a central rib 44a formed on the surface thereof abutting the end plate 19a so that the outer edges of the plate 44 are spaced from the end plate 19a whereby suitable means can be inserted between the two plates in order to move the cover plate 44 axially outwardly with relation to the mold sections. Such action draws the wire 41 from the mold.

In operation, the wire 41 is positioned in the mold, and the end thereof at the tip of the deicer shoe may be laid or removably secured in position in any suitable manner, as desired. Then the mass of rubber used to form the deicer shoe is placed in the mold, the mold closed and heat applied thereto to shape and vulcanize the deicer shoe. Next the wire 41 is drawn from the mold by pulling out the headed pin 43 from the mold, after which the mold can be opened and the deicer shoe formed removed. It will be seen that by suspending the wire 41 in the molding cavity, a conduit can be formed in a deicer shoe in a manner similar to that used in forming a recess on the under surface of the deicer shoe, as explained hereinbefore.

The detailed description of the particular embodiments of the invention illustrated and described herein is not to be construed as limited the invention thereto. The invention includes all features of patentable novelty residing in the foregoing description and the accompanying drawings.

What is claimed is:

1. A mold comprising a base section having a triangular cross-sectional portion, a cover section for said base section adapted to mate therewith and form a V-shaped mold cavity, a thin strip secured to and extending longitudinally of the inner surface of one of said mold sections to provide a rib thereon extending into said cavity to mold a groove in an article molded therein, and a plug secured to and extending through said latter mold section and interrupting said strip, said plug carrying a rib on its inner end, the rib on said plug abutting and extending between the confronting ends of the interrupted strip to provide a continuous rib therewith, said mold sections also defining air chambers therebetween adjacent said cavity to facilitate escape of air therefrom during mold operations.

2. A mold comprising a base section, a cover section for said base section adapted to mate therewith and form a cavity therebetween, a plurality of strips secured to the inner surface of said cover section, a portion of said strips converging toward each other and extending into said cavity in order to mold grooves in an article located therein, and a metallic plug secured to said cover member, said plug carrying converging ribs on its inner end abutting and extending between the ends of said strips secured to the inner surface of said cover section to provide continuous converging ribs in said mold.

3. A mold for forming a rubber deicer shoe, said mold comprising a base section, a cover section for said base section adapted to mate therewith and define a cavity therebetween, a plurality of strips removably associated with said cover section and extending into said cavity to form spaced longitudinally extending grooves in any deicer shoe formed therein, a plurality of metallic plugs removably secured to and extending through said cover section at longitudinally spaced regions thereof, and means formed on said plugs to mold grooves in any shoes formed in the mold, which grooves connect the ends of one longitudinally extending groove with another longitudinally extending groove.

4. A mold as in claim 2 including a wire positioned on the top of the base mold section to mold a groove in the under surface of an article located in the mold, and means secured to said wire and operatively associated with said mold to facilitate withdrawal of said wire from said mold.

5. A mold for an article of the type described, comprising in combination separable body members having recesses therein which together constitute a mold opening conforming in shape to the exterior contour of the article being molded, one of said members being a cover mold section having longitudinally extending ribs on its inner surface and projecting into said opening, said ribs converging toward each other for part of their extent, a portion of the inner surface of said cover mold section on which said converging point occurs being formed separate from said cover mold section proper and being attached thereto, said separately formed portion having a molding surface with ribs similar to those of said cover mold section, said separately formed portion being attached to said section in such manner that together they present continuous ribs and a smooth molding surface to an article confined in said mold.

6. A mold for forming a rubber deicer shoe, said mold comprising a base section, a cover section for said base section adapted to mate therewith and form a cavity therebetween, a plurality of strips removably associated with said cover section and extending into said cavity in order to form spaced longitudinally extending grooves in any deicer shoe formed therein, at least one plug removably secured to said cover and being exposed on the under surface of said cover section, and means formed on said plug to form grooves in any shoes formed in said mold, which grooves connect the ends of one longitudinally extending groove with another longitudinally extending groove.

7. A mold comprising a base section having a triangular cross-sectional portion, a cover section for said base section adapted to mate therewith and form a V-shaped mold cavity, a thin strip secured to and extending longitudinally of the inner surface of one of said mold sections to provide a rib thereon extending into said cavity in order to form a groove in an article molded therein, and a plug secured to and extending through said latter mold section, said plug carrying a rib on its inner end, the rib on said plug abutting and extending between the ends of said strip to provide a continuous rib therewith.

ROY W. BROWN.